(12) United States Patent
Haddad

(10) Patent No.: US 9,107,048 B2
(45) Date of Patent: Aug. 11, 2015

(54) METHODS AND SYSTEMS FOR MOBILE IP ROUTE OPTIMIZATION

(75) Inventor: Wassim Haddad, Boulder, CO (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1280 days.

(21) Appl. No.: 12/562,869

(22) Filed: Sep. 18, 2009

(65) Prior Publication Data

US 2010/0329184 A1 Dec. 30, 2010

Related U.S. Application Data

(60) Provisional application No. 61/224,610, filed on Jul. 10, 2009, provisional application No. 61/221,219, filed on Jun. 29, 2009.

(51) Int. Cl.
*H04W 8/08* (2009.01)
*H04L 29/06* (2006.01)
*H04W 80/04* (2009.01)

(52) U.S. Cl.
CPC ............... *H04W 8/082* (2013.01); *H04L 63/04* (2013.01); *H04L 63/0869* (2013.01); *H04L 63/164* (2013.01); *H04W 80/04* (2013.01)

(58) Field of Classification Search
None
See application file for complete search history.

(56) References Cited

U.S. PATENT DOCUMENTS

| | | | |
|---|---|---|---|
| 2002/0147820 A1* | 10/2002 | Yokote | 709/229 |
| 2007/0037553 A1* | 2/2007 | Patel et al. | 455/410 |
| 2008/0253382 A1 | 10/2008 | Bachmann et al. | |
| 2008/0316956 A1 | 12/2008 | Turanyi et al. | |

FOREIGN PATENT DOCUMENTS

| | | |
|---|---|---|
| CN | 101268670 A | 9/2008 |
| CN | 101346947 A | 1/2009 |
| EP | 1 030 491 A2 | 8/2000 |
| EP | 1 986 392 A1 | 10/2008 |
| WO | WO 2009/065923 | 5/2009 |

OTHER PUBLICATIONS

Arkko. A Taxonomy and Analysis of Enhancements to Mobile IPv6 Route Optimization. IETF Standard Internet Engineering Task Force. RFC 4651 Feb. 1, 2007.
Arkko, et al. Enhanced Route Optimization for Mobile IPv6. IETF Standard. Internet Engineering Task Force. RFC 4866. May 1, 2007.
Narten, et al. Neighbor Discovery for IP Version 6 (IPv6). RFC 2461. Dec. 1998.
Aura, T. Cyrptographically Generated Addresses (CGA). RFC 3972. Mar. 2005.
Johnson, D. et al. Mobility Support for IPv6. Internet Draft; draft-ietf-mext-rfc3775bis-03.txt; Mar. 2009.
Arkko, J. et al. Secure Neighbor Discovery (SeND). RFC 3971. Mar. 2005.

(Continued)

*Primary Examiner* — Jackie Zuniga Abad

(57) ABSTRACT

The present application relates to network mobility (e.g., mobility in an IPv6 network). More specifically, the present application discloses systems and methods for enabling mobile nodes to switch to a routing optimization mode using a minimum of mobility messages.

30 Claims, 14 Drawing Sheets

(56) References Cited

OTHER PUBLICATIONS

Bradner, S. Key Words for Use in RFCs to Indicate Requirement Levels. RFC 2119 BCP. Mar. 1997.

Haddad, W. et al. On Secure Neighbor Discovery Proxying Using 'Symbolic' Relationship Internet Draft; draft-haddad-csi-symbiotic-sendproxy-00.txt. Oct. 2008.

* cited by examiner

METHODS AND SYSTEMS FOR MOBILE IP ROUTE OPTIMIZATION

CROSS REFERENCE TO RELATED APPLICATIONS

This application claims the benefit of U.S. Provisional Patent App. No. 61/224,610, filed on Jul. 10, 2009, and U.S. Provisional Patent App. No. 61/221,219, filed on Jun. 29, 2009. The above identified applications are incorporated by reference herein.

TECHNICAL FIELD

The present invention relates to the field of communications, and more particularly, to an enhancement for mobile IP route optimization.

BACKGROUND

Request for Comment (RFC) 3775, which is incorporated by reference herein, specifies a protocol which allows mobile nodes to remain reachable while moving around in the IPv6 Internet. Without specific support for mobility in IPv6, packets destined to a mobile node would not be able to reach the node while it is away from its home link. Mobility support is particularly important, as mobile computers are likely to account for at least a substantial fraction of the population of the Internet during the lifetime of IPv6.

The protocol defined in RFC 3775, which is known as Mobile IPv6, allows a mobile node to move from a home link to another link without changing the mobile node's "home address" (HoA). Packets may be routed to the mobile node using this address regardless of the mobile node's current point of attachment to the Internet. Accordingly, a mobile node is always expected to be reachable at its home address, whether it is currently attached to its home link or is away from home. The "home address" is an IP address assigned to the mobile node within its home subnet prefix on its home link. While a mobile node is at home, packets addressed to its home address are routed to the mobile node's home link, using conventional Internet routing mechanisms.

While a mobile node is attached to some foreign link away from home, it is also addressable at one or more "care-of addresses." A care-of address ("CoA") is an IP address associated with a mobile node that has the subnet prefix of a particular foreign link. The mobile node can acquire its care-of address through conventional IPv6 mechanisms, such as stateless or stateful auto-configuration. As long as the mobile node stays in this location, packets addressed to this care-of address will be routed to the mobile node.

The association between a mobile node's home address and care-of address is known as a "binding" for the mobile node. While away from home, a mobile node registers its primary care-of address with a "home agent" (e.g., a router or other node) on its home link. The mobile node performs this binding registration by sending a "Binding Update" message to the home agent. The home agent may reply to the mobile node by returning a "Binding Acknowledgement" message.

Any node communicating with a mobile node is referred to in this document as a "correspondent node", and may itself be either a stationary node or a mobile node.

When a mobile node is away from its home (i.e., connected to a foreign link), there are two possible modes for communications between the mobile node and a correspondent node. The first mode is referred to as the "bidirectional tunneling" mode. In the bidirectional tunneling mode, packets from the correspondent node to the mobile node are routed to the mobile node's home agent and then tunneled by the home agent to the mobile node. Similarly, packets from the mobile node to the correspondent node are tunneled from the mobile node to the home agent ("reverse tunneled") and then routed normally from the home agent to the correspondent node.

The second mode is referred to as the "route optimization" (RO) mode. In the route optimization mode, packets from the correspondent node to the mobile node can be routed directly to the care-of address of the mobile node. Routing packets directly to the mobile node's care-of address allows the shortest communications path to be used. It also may reduce congestion at the mobile node's home agent and home link. When routing packets directly to the mobile node, the correspondent node sets the Destination Address in the IPv6 header to the care-of address of the mobile node. A new type of IPv6 routing header is also added to the packet to carry the mobile nodes home address. Similarly, the mobile node sets the Source Address in the packet's IPv6 header to its current care-of addresses. The mobile node adds a new IPv6 "Home Address" destination option to carry its home address. The inclusion of home addresses in these packets makes the use of the care-of address transparent at the transport layer.

In order for a mobile node and a corresponding node to enter the RO mode, the correspondent node must have an association between the mobile node's home address and CoA and the mobile node and corresponding node must perform a "return routability" (RR) procedure. The RR procedure consists of exchanging four mobility signaling messages between the mobile node (MN) and correspondent node (CN) in order to test the MN's reachability on the claimed care-of address (CoA) and its home address and to generate a shared secret between the two nodes which is then used to authenticate a binding update (BU) and binding acknowledgment (BA) messages. It follows that successfully entering the RO mode requires in total six mobility messages, and, if we take into consideration that the MN needs first to update its home agent (HA) prior to triggering the RR procedure, then the total number of signaling messages would reach eight.

It becomes clear from the above that exchanging eight signaling messages each time the MN and a CN enter the RO mode may incur a significant data packet loss and/or delay. A further drawback is that the MN must repeat the RR procedure every 420 seconds due to security concerns. Furthermore, if the MN is having multiple sessions with different CNs then it has to repeat the RR which each CN, which in turn may severely impact the MN's power consumption.

SUMMARY

An objective of the invention is to overcome at least some of the above described RO mode disadvantages. In one aspect, this is achieved by providing an improved procedure for entering the RO mode that requires fewer signaling messages than the conventional RO mode procedures. Because fewer signaling messages are used, handoff latency decreases as well as mobile node power consumption.

Accordingly, in one aspect, the present invention provides a method for route optimization that does not require a return routability procedure. In one embodiment, the method begins with a mobile node's home agent (HA) receiving an update message transmitted from the mobile node. This update message includes a care-of-address (CoA) associated with the mobile node. In response to receiving the update message from the mobile node, the home agent binds the CoA associated with the mobile node with a home address (HoA) assigned to the mobile node. After receiving the update message, the home agent transmits a second update message to: (a) a correspondent node or (b) the correspondent node's home agent. The update message transmitted from the home agent includes the CoA associated with the mobile node and the HoA assigned to the mobile node. In this manner, a correspondent node can obtain the mobile node's CoA without the mobile node and the correspondent node having to perform the RR procedure.

In some embodiments, the correspondent node is a mobile node and the correspondent node has the same home agent as the first recited mobile node (MN). In such an embodiment, the method may also include the step of receiving, at the home agent, an update message transmitted from the correspondent node. This update message includes a CoA associated with the correspondent node. In response to receiving this update message, the home agent binds the CoA associated with the correspondent node with a HoA assigned to the correspondent node (CN). Preferably, the home agent does not transmit the second recited update message until after it receives the update message transmitted from the CN.

In some embodiments, the home agent (HA) determines whether there is a relationship between the MN and the CN after receiving the update message transmitted from the CN. In response to determining that there is a relationship between the MN and CN, the HA transmits to the MN the CoA associated with the CN and transmits to the CN the CoA associated with the MN. In some embodiments, the step of determining whether there is a relationship between the MN and the CN comprises determining whether there is a cryptographic relationship between the MN and the CN.

In some embodiments, the update message transmitted from the MN comprises a modifier value obtained from the CN and an address generated by the CN. The modifier value may be calculated by the CN by hashing a public key belonging to the MN with a random number. The update message transmitted from the CN may include a modifier value obtained from the MN and an address generated by the MN. The modifier value may be calculated by the MN by hashing a public key belonging to the CN with a random number.

In other embodiments, the CN is a mobile node but has a different HA than the first recited mobile node and the second recited update message is transmitted from the MN's HA to the CN's HA. In this embodiments, the method may also include receiving at the MN's HA a message comprising a CoA associated with the CN, wherein the message including the CoA associated with the CN was transmitted to the MN's HA from the CN's HA. In some embodiments, the MN's HA transmits to the MN a message comprising the CoA associated with the CN in response to receiving the message containing the CoA associated with the CN. In response to receiving the message from the MN's HA, the MN may add to its binding update list a record comprising the CoA associated with the CN.

In some embodiments, the HA, prior to transmitting the update message to the CN, transmits to the CN a message (e.g., a Neighbor Solicitation message). In response, the CN transmits a message back to the HA. Preferably, at least some of the information included in the message sent back to the HA from the CN depends on whether the CN has a relationship with the MN. The HA, upon receiving the message from the CN, uses information contained in the message to determine whether there is a trusted relationship between the MN and the CN. The HA is configured such that the HA will transmit the update message to the CN if and only if the HA determines that there is a trusted relationship between the MN and the CN. The information contained in the message transmitted from the CN to the HA in response to the solicitation message may include (i) parameters associated with the mobile node (e.g., an encrypted shared secret, the MN's public key, information signed using the MN's private key) and (ii) a secret that is used by the HA to encrypt information included in the update message transmitted from the HA to the CN.

In some embodiments, the mobile node has a home link, the correspondent node is a node with which the mobile node is communicating, and the home agent comprises a router on the mobile node's home link. After the mobile node connects to a foreign link and provides a CoA to the router, the router may (a) intercept packets on the home link destined to the mobile node's home address, and tunnel the intercepted packets to the mobile node's CoA.

In another aspect, the present invention provides an apparatus for facilitating mobile IP route optimization (RO). In some embodiments, the apparatus includes a network interface operable to receive from a mobile node an update message comprising a care-of-address (CoA) associated with the mobile node. The apparatus also includes a data processing system configured to (1) bind the CoA associated with the mobile node with a home address (HoA) assigned to the mobile node in response to receiving the update message and (2) transmit to (i) a correspondent node or (ii) the correspondent node's home agent a second update message comprising the CoA associated with the mobile node and the home address assigned to the mobile node after receiving the first update message. In this manner, the apparatus facilitates mobile IP route optimization by informing the correspondent node of the mobile node's CoA.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
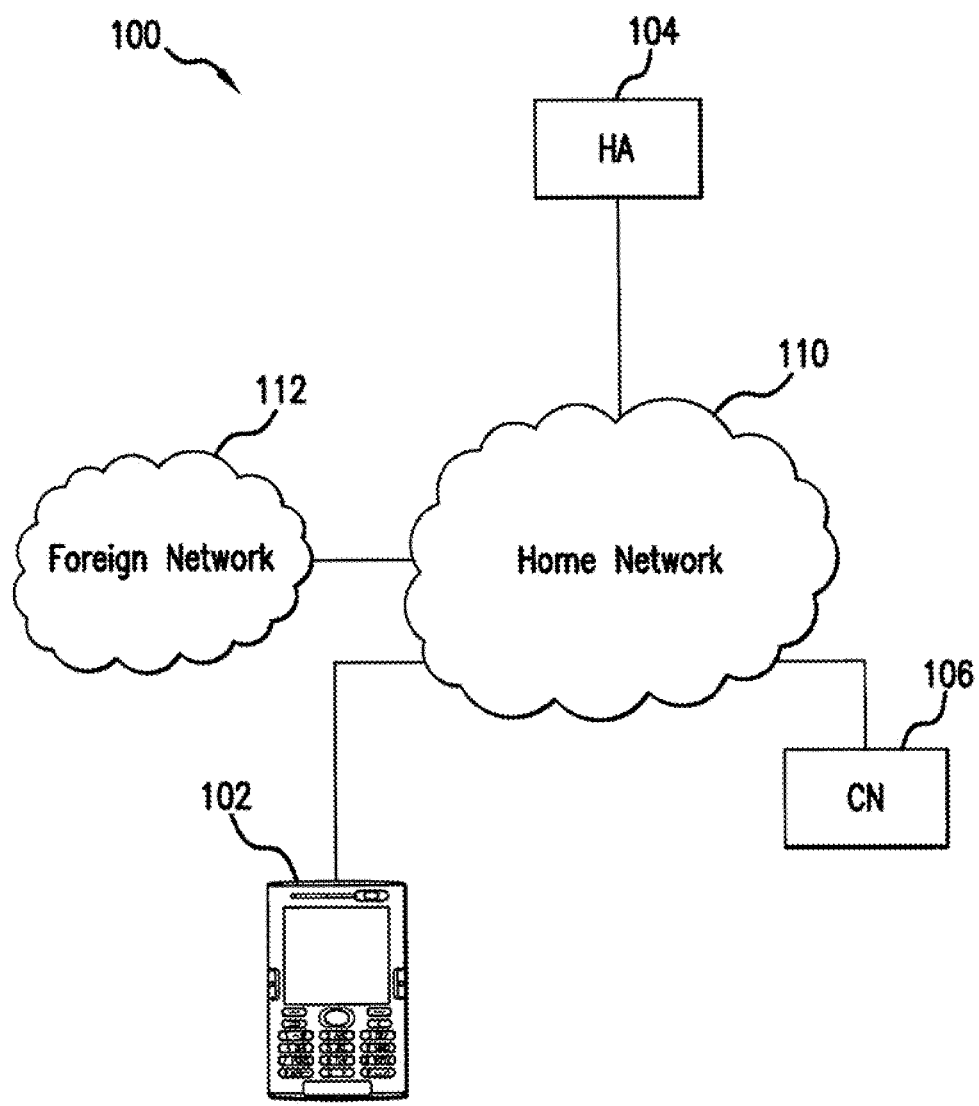
FIG. 1 illustrates a MN in communicate with a CN while the MN is connected to an internet via its home link.
Figure 2:
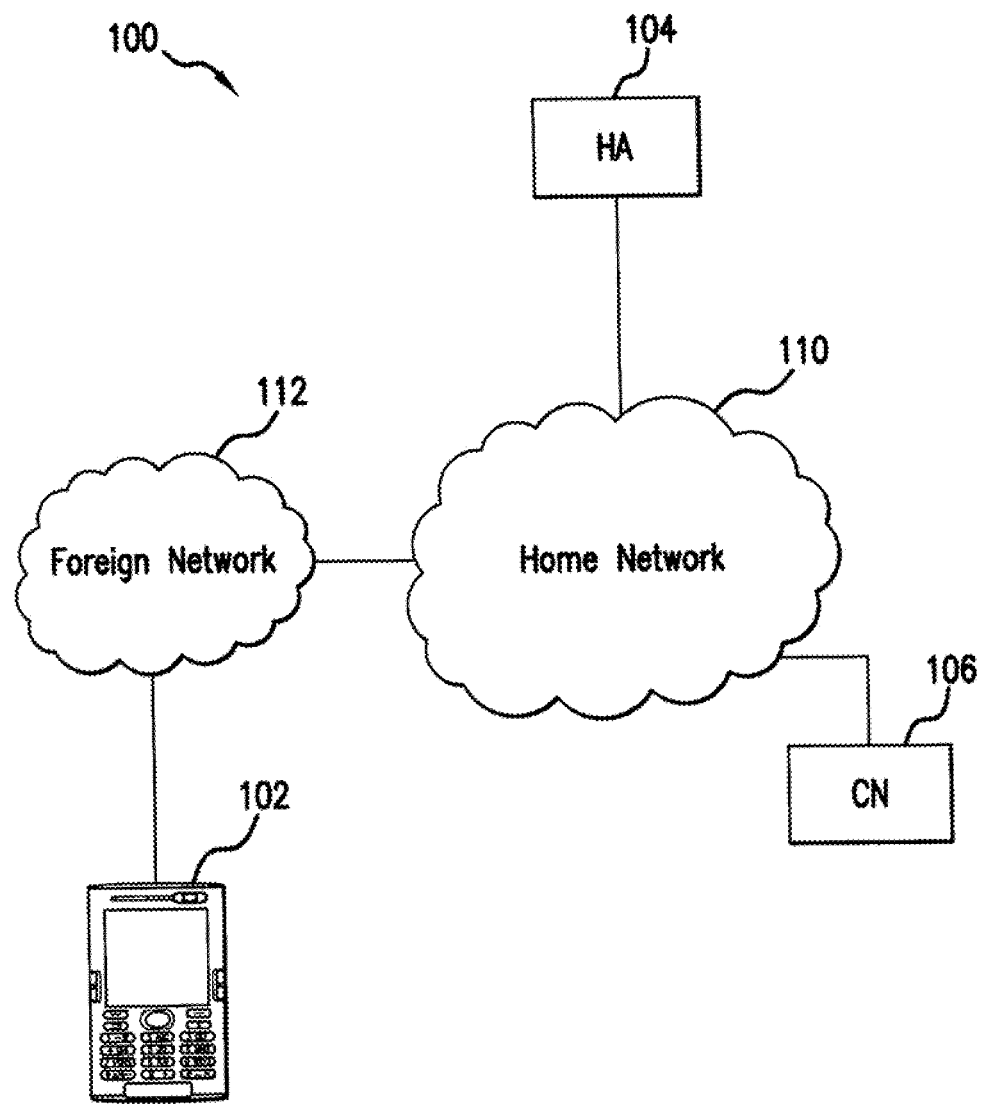
FIG. 2 illustrates the MN in communicate with the CN while the MN is connected to the internet via a foreign link.

Referring now to FIG. 1, FIG. 1 illustrates a communication system 100. System 100 includes a mobile node (MN) 102, a home network 110 (a.k.a, "home link"), a home agent 104, and a foreign network (a.k.a, "foreign link") 112. To illustrate the various embodiments of the invention, we shall assume MN 102 has established a session (e.g., a TCP session or other session) with a correspondent node (CN) 106. We shall also assume that, as shown in FIG. 2, MN 102 moves away from its home network 110 without ending the session established with CN 106. That is, while the session with CN 106 is ongoing, MN 102 attaches to a foreign network and is assigned a care-of-address (CoA).

As discussed above, when MN 102 is away from its home, there are at least two possible modes in which MN 102 may communicate with CN 106: (1) the bidirectional tunneling mode and (2) the RO mode. As also discussed above, there are advantages for MN 102 and CN 106 to communicate in the RO mode. For example, when MN 102 and CN 106 communicate using the RO mode, packets from CN 106 to MN 102 can be routed directly to the CoA of the mobile node. Routing packets directly to the mobile node's CoA allows the shortest communications path to be used and reduces congestion at the mobile node's home agent and home link. Because the RO mode enables a more efficient data packet exchange than the bidirectional tunneling, the RO mode should be used whenever possible unless the mobile node is not interested in disclosing its topological location, i.e., care-of address, to the CN (e.g., for privacy reasons).

Figure 3:
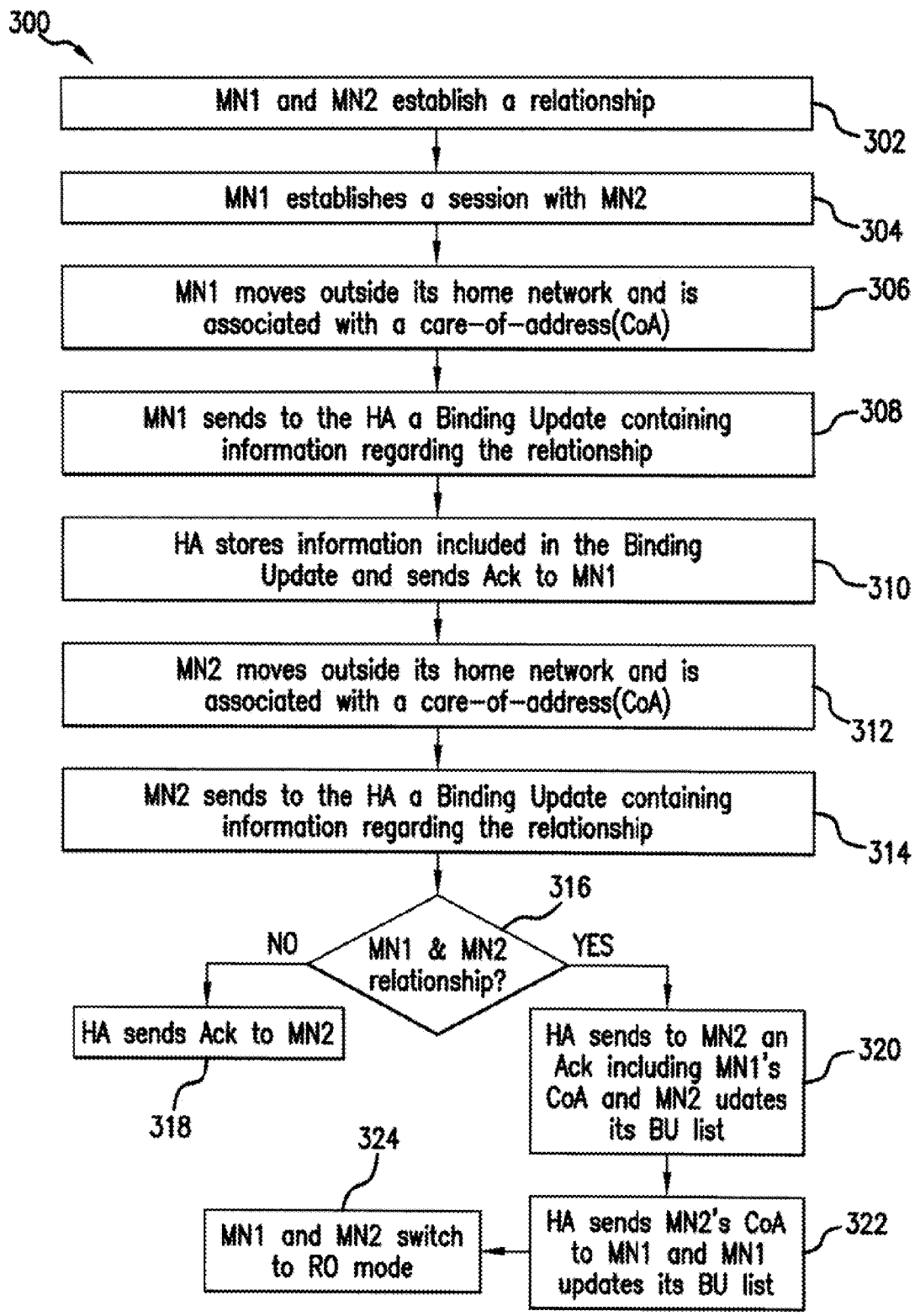
FIG. 3 is a flow chart illustrating a process, according to a first embodiment of the invention, for performing an RO procedure.

Referring now to FIG. 3, FIG. 3 is a flow chart illustrating a process 300, according to a first embodiment, for enabling MN 102 and CN 106 to enter (i.e., "switch on") the RO mode using fewer signaling messages than is required by the return routability (RR) procedure described in RFC 3775. Being able to enter the RO mode using fewer signaling message has several advantages: For example, it results in a lower handoff latency, thereby increasing communication efficiency. It also results in an improved power efficiency in the mobile node.

Process 300 assumes that CN 106 is a mobile node using the same HA (or cluster) as MN 102. For simplicity, MN 102 shall be referred to as MN1 and CN 106 shall be referred to as MN2. Process 300 may begin in step 302, where MN1 and MN2 each (a) auto-configure their IPv6 home address using the "cryptographically generated addresses (CGA)" technique (see RFC 3792, March 2005) and (b) establish a mutual relationship with the other. This mutual relationship is referred to as a "trusted relationship" or "symbiotic relationship." Establishing the trusted relationship can be achieved using the "Secure Neighbor Discovery" protocol (see RFC 3971, March 2005). Additionally, other methods for establishing a relationship are known in the art (see e.g., WO2009065923, having an international filing date of 21 Nov. 2008, which publication is incorporated by reference herein). In some embodiments, the trusted relationship between MN1 and MN2 is of a cryptographic nature and may be established as a consequence of a mutual social relationship between the respective owners of MN1 and MN2. In some embodiments, establishing a trusted relationship between MN1 and MN2 requires MN1 to establish a unidirectional relationship with MN2 and requires MN2 to establish a unidirectional relationship with MN1. In some embodiments, when MN2 establishes a unidirectional relationship with MN1, MN2 receives MN1's public key and generates a 128-bit modifier from hashing MN1's public key together with a 128-bit random number (RAN) (Modifier=First [128, SHA-2(PK(MN1)|RAN)]). MN2 then confidentially notifies MN1 about the 128 bit modifier. Likewise, when MN1 establishes a unidirectional relationship with MN2, MN1 receives MN2's public key and generates a 128-bit modifier from hashing MN2's public key together with a 128-bit random number (RAN). MN1 then confidentially notifies MN2 about the 128 bit modifier.

Figure 4:
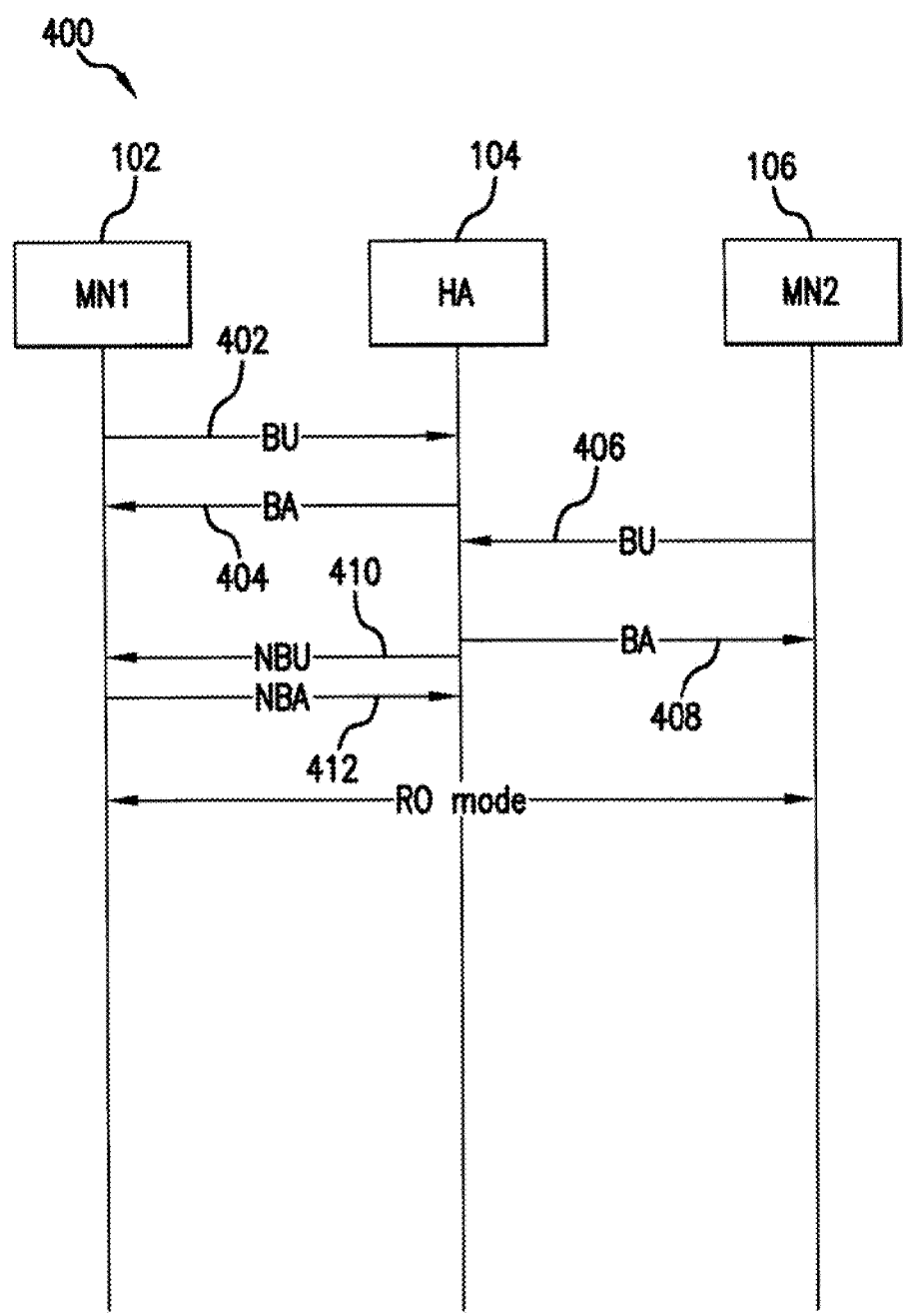
FIG. 4 is a message flow diagram illustrating the RO procedure of FIG. 3.

In step 304, MN1 establishes a session (e.g., a TCP session) with MN2 (or vice-versa). In step 306, MN1 moves outside its home network and is associated with and obtains a CoA. In step 308, MN1 sends to HA 104 a Binding Update (BU) message 402 (see the message flow diagram 400 shown in FIG. 4). As used herein, a BU message is a message containing a "Mobility Header" (defined in section 6.1 of RFC 3775) where the MH type field of the Mobility Header is set to a value of 5. The BU message 402 transmitted in step 308 includes (a) the CoA obtained my MN1 in step 306 and (b) information disclosing the relationship between MN1 and MN2. This information is referred to as "proof of relationship" information. The proof of relationship information that is contained in BU message 402 may include: (a) information identifying MN2 (e.g., an address generated by MN2), (b) MN2's public key, and (c) a shared secret (e.g., the 128 bit modifier received from MN2). Preferably, for security, BU message 402 is transmitted to HA 104 using an IPsec tunnel established between MN1 and HA 104.

In step 310, HA 104 associates the CoA included in message 402 with MN1's home address (e.g., HA 104 creates a Binding Cache entry), stores the proof of relationship information, and sends an acknowledgement message 404 (see FIG. 4) to MN1. The proof of relationship information may be stored in the Binding Cache entry or otherwise associated with MN1's home address and/or CoA. Message 404 may be a Binding Acknowledgment (BA) message (see RFC 3775).

In step 312, MN2 moves outside its home network and obtains a CoA. In step 314, MN2 sends to HA 104 a Binding Update (BU) message 406 (see FIG. 4). The BU message 406 transmitted in step 314 includes (a) the CoA obtained by MN2 in step 312 and (b) information disclosing the relationship between MN2 and MN1. This information is referred to as "proof of relationship" information. The relationship information that is contained in BU message 406 may include: (a) information identifying MN1 (e.g., a home address generated by MN1), (b) MN1's public key, and (c) the 128 bit modifier received from MN1. Preferably, for security, BU message 406 is transmitted to HA 104 using an IPsec tunnel established between MN2 and HA 104.

In step 316, HA 104 determines, based on the information in BU messages 402 and 406, whether MN1 and MN2 have a trusted relationship. For example, in some embodiments, in response to receiving and validating BU message 406, which message indicates that MN2 asserts to have a trusted relationship with MN1, HA 104 retrieves the proof of relationship information stored in step 310 to determine whether MN1 also asserts that it has a relationship with MN2. In this way, HA 104 can determine whether there is a trusted relationship between MN1 and MN2 (i.e., HA 104 can determine that MN1 asserts to have a relationship with MN2 and MN2 asserts to have a relationship with MN1). If HA 104 determines, that MN1 and MN2 do not have a trusted relationship, then process 300 proceeds to step 318, otherwise process 300 proceeds to step 320. In step 318, HA 104 may send to MN2 a conventional BA message (i.e., a BA message that does not include MN1's CoA).

In step 320, HA 104 sends to MN2 a BA message 408 that includes MN1's CoA. Message 408 may also include information that notifies MN2 that HA 104 will send (or has sent) MN2's CoA to MN1. This information can be encoded in a single bit referred to as a "buddy" bit. In response to message 408, MN2 may create a Binding Cache entry (i.e., store information associating MN1's HoA with MN1's CoA) and may update its Binding Update list to indicate that MN1 has received (or will soon receive) a "binding update" concerning MN2's CoA.

At the same time that message 408 is transmitted, HA 104 sends a message 410 to MN1 (step 322). Message 410 includes MN2's CoA. Message 410 may be referred to as a "Neighbor Binding Update (NBU)" message. In response to receiving NBU message 410, MN1 may send to HA 104 a Neighbor Binding Ack (NBA) message 412. In order to increase the overall performance, HA 104 can send multiple copies of the NBU message 410 until it receives the NBA message 412. Also, in response to message 410, MN1 may create a Binding Cache entry (i.e., store information associating MN2's HoA with MN2's CoA) and may update its Binding Update list to indicate that MN2 has received a "binding update" concerning MN1's CoA.

In step 324, MN1 and MN2 can switch to RO mode because each has the other's CoA.

In this manner, the RO mode can be entered without MN1 having to send any mobility message to MN2 and vice-versa. That is, the inclusion of MN 1's CoA in BA message 408 together with sending the NBU message 410 to MN1 allow both mobile nodes MN1 and MN2 to quickly learn each other's current topological location from a trusted source and to create the necessary binding in order to redirect their data packets on the optimized path. This produces the following advantages: (1) the return routability (RR) procedure is entirely removed which means the number of signaling messages is reduced to zero and the two MNs won't need to share secrets and refresh them (thus helping increase the service provider's available bandwidth instead of being consumed by signaling messages); (2) removes the need to upgrade CNs to understand RR signaling, as such, it can be seen as a first step towards deploying the RO mode between nodes belonging to the same home network with zero signaling on the direct path; (3) significantly reduces IP handoff latency; and (4) reduces mobile node power consumption.

It should be noted that steps 314-324 may be repeated whenever MN2 obtains a new CoA. Additionally, process 300 can be extended to include multiple mobile nodes. That is, MN2 may have a trusted relationship not only with MN1, but also with MN3, in which case HA 104, in step 320, will send an NBU message to each mobile with which MN2 has a trusted relationship. Process 300 also applies to the case where MN1 or MN2 has multiple interfaces (e.g., multiple home addresses). In this case, HA 104 can also notify the mobile node about using a CoA which is configured on another interface attached to the mobile node's device and/or about a CoA configured on another interface attached to the other endpoint's device.

Figure 5:
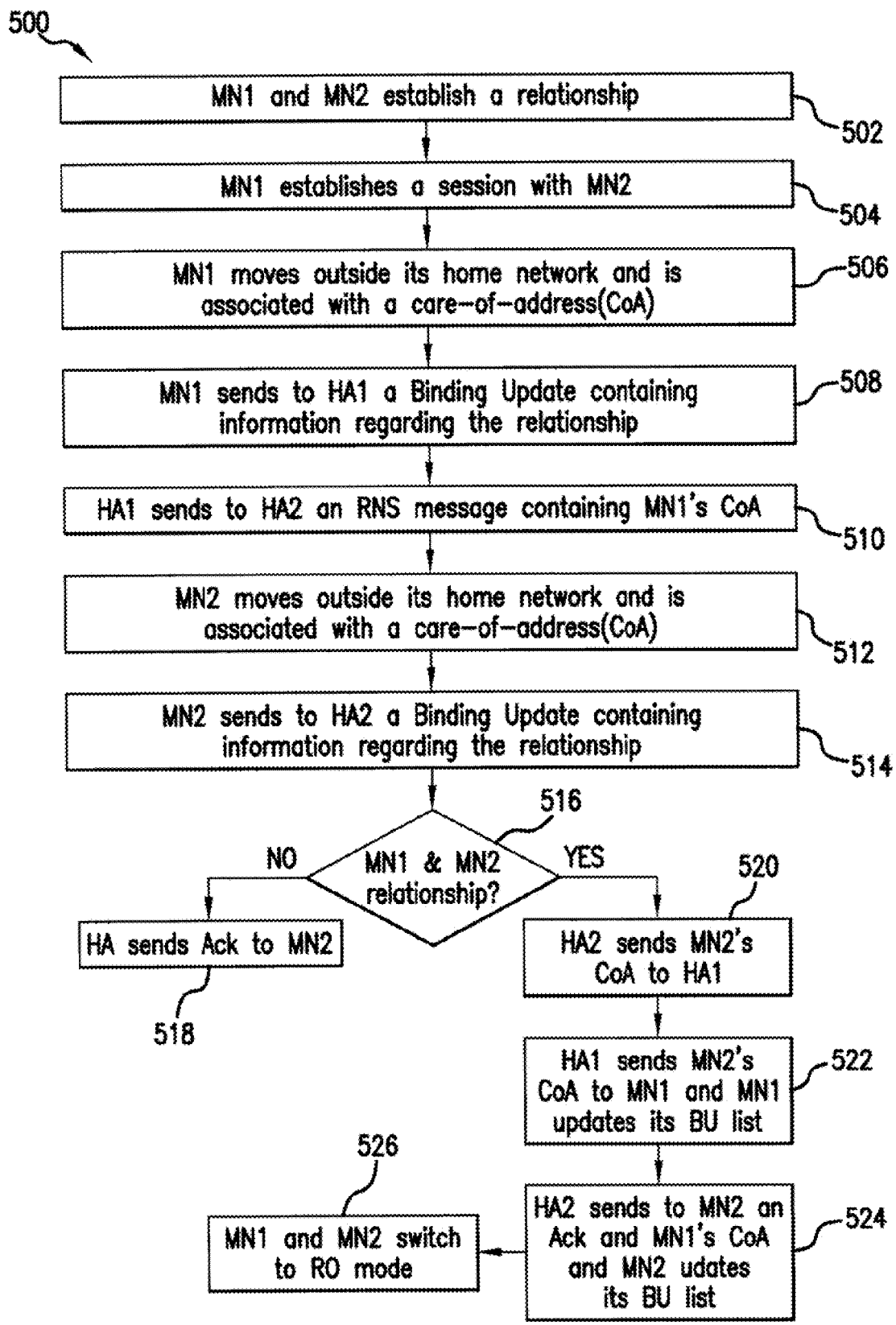
FIG. 5 is a flow chart illustrating a process, according to a second embodiment of the invention, for performing an RO procedure.

Referring now to FIG. 5, FIG. 5 is a flow chart illustrating a process 500, according to a second embodiment, for enabling MN 102 and CN 106 to enter the RO mode using few mobility messages.

Process 500 assumes that CN 106 is a mobile node using a different HA (or cluster) than MN 102. For simplicity, MN 102 shall be referred to as MN1, CN 106 shall be referred to as MN2, MN1's home agent shall be referred to as HA1, and MN2's home agent shall be referred to as HA2. Process 500 also assumes that HA1 has HA2's IP address and well as HA2's advertised prefixes) and public key(s) and vice-versa. For example, HA1 and HA2 may each have a list of other HAs' and their corresponding IP addresses, prefixes and keys. Preferably, for security purposes, HA1 and HA2 can set up and IPsec tunnel between them.

Process 500 may begin in step 502, where MN1 and MN2 each (a) auto-configure their IPv6 home address using the CGA technique and (b) establish a relationship with the other, as described above with reference to process 300.

In step 504, MN1 establishes a session with MN2 (or vice-versa). In step 506, MN1 moves outside its home network and is associated with and obtains a CoA.

Figure 6:
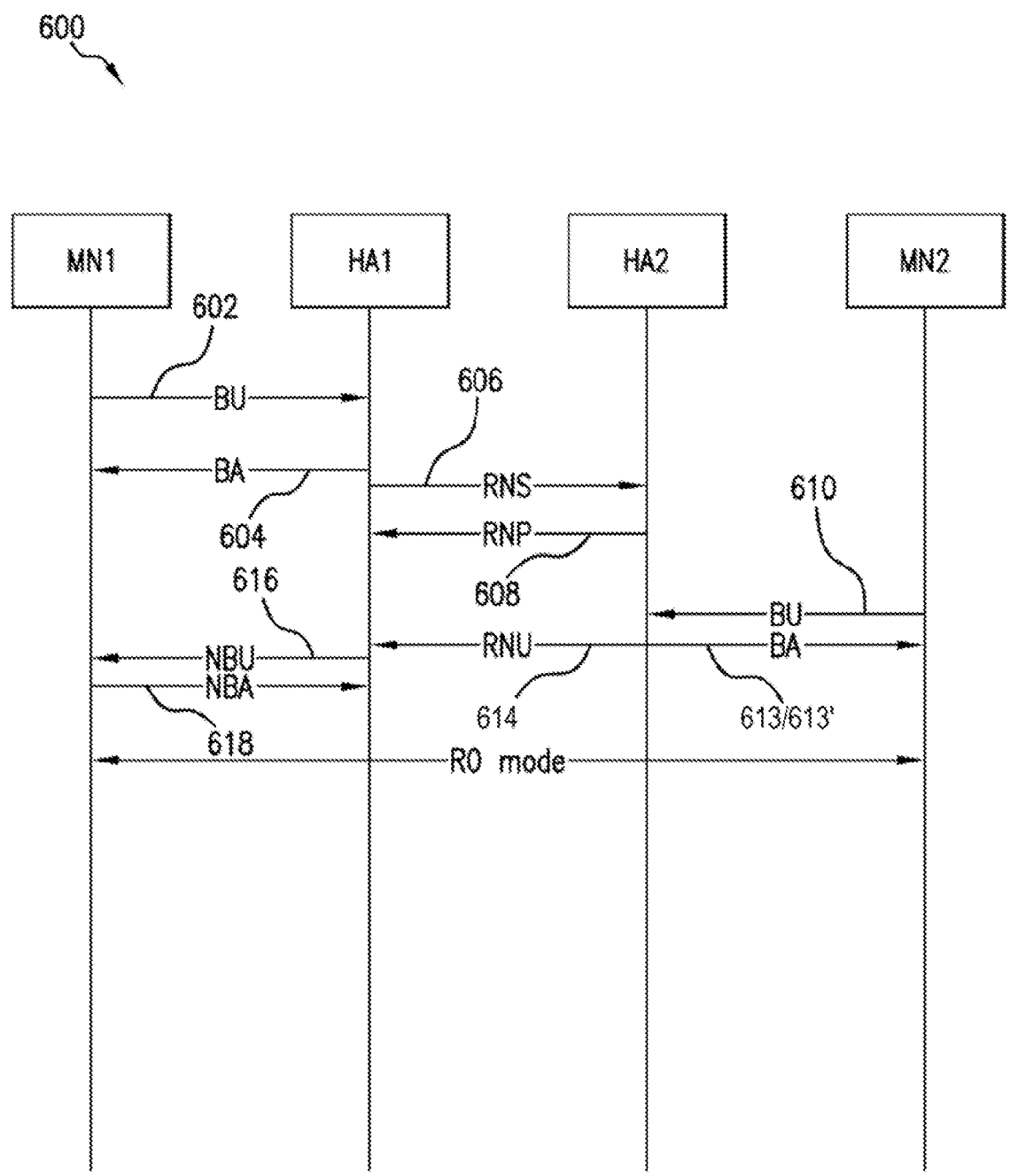
FIG. 6 is a message flow diagram illustrating the RO procedure of FIG. 5.

In step 508, MN1 sends to HA1 a BU message 602 (see the message flow diagram 600 shown in FIG. 6). The BU message 602 transmitted in step 508 includes (a) the CoA obtained by MN1 in step 506 and (b) information disclosing the relationship between MN1 and MN2. This information is referred to as "proof of relationship" information, examples of which are provided above in the description of process 300.

In step 510, in response to message 602, HA1 creates a binding cache entry for MN1, sends to MN1 a BA message 604 (see FIG. 6), uses at least some of the proof of relationship information (e.g., MN2's IP address) to obtain HA2's corresponding parameters (e.g., HA2's IP address and public key) and sends to HA2 an update message 606 (a.k.a., a "RO Neighbor Solicitation (RNS)" message). Message 606 includes MN1's CoA and information indicating that MN1 has disclosed in message 602 that MN1 has a relationship with MN2. Thus, message 606 may include information identifying MN1 (e.g., MN1' home address) and may also include at least some of the proof of relationship information included in message 602 (e.g., MN2's home address). Assuming that MN2 is still attached to its home network at the time message 606 is received, HA2 simply stores information included in message 606 for later use, as described below. Additionally, HA2 may send to HA1 a RO Neighbor Present (RNP) message 608 (see FIG. 6). Message 608 is used to inform HA1 of MN2's status.

In step 512, MN2 moves outside its home network and obtains a CoA. In step 514, MN2 sends to HA2 a BU message 610 (see FIG. 6). The BU message 610 transmitted in step 514 includes (a) the CoA obtained by MN2 in step 512 and (b) information disclosing the relationship between MN2 and MN1 (e.g., MN1's IP address).

In step 516, HA2 determines, based on the information in BU message 610 and RNS message 606, whether MN1 and MN2 have a trusted relationship. For example, in step 516, in response to receiving BU message 610, which may include MN1's home address, HA2 uses MN1's home address to determine whether HA2 has received from HA1 an RNS message indicating that MN1 has disclosed a relationship with MN2 and, if such an RNS message was received from HA1, then HA2 retrieves MN1's CoA, which was included in the RNS message.

If HA 104 determines, that MN1 and MN2 do not have a trusted relationship, then process 500 proceeds to step 518, otherwise process 500 proceeds to step 520. In step 518, HA2 may send to MN2 a conventional BA message 613 (i.e., a BA message 613 that does not include MN1's CoA).

In step 520, HA2 sends to HA1 MN2's CoA. For example, in step 520, HA2 may send to HA1 an RO Neighbor Update (RNU) message 614 that includes MN2's CoA. In step 522, in response to message 614, HA1 sends to MN1 MN2's CoA. For example, in step 522, HA1 sends to MN1 a NBU message 616 containing MN2's CoA. In response to message 616, MN1 may create a Binding Cache entry (i.e., store information associating MN2's HoA with MN2's CoA) and may update its Binding Update list to indicate that MN2 has received (or will soon receive) a "binding update" message concerning MN1's CoA.

In step 524, HA2 sends to MN2 a BA message 613' that includes MN1's CoA. Message 613' may also include information that notifies MN2 that HA2 will send (or has sent) MN2's CoA to HA1. In some embodiments, after HA2 sends the RNU 614 to HA1, HA2 waits for an acknowledgement from HA1 before performing step 524. In response to message 613', MN2 should create a Binding Cache entry (i.e., store information associating MN1's HoA with MN1's CoA) and should update its Binding Update list to indicate that MN1 has received a "binding update" concerning MN2's CoA.

In response to receiving NBU message 616, MN1 may send to HA1 a Neighbor Binding Ack (NBA) message 618. In step 526, MN1 and MN2 can both switch to RO mode because each has the other's CoA.

Figure 7:
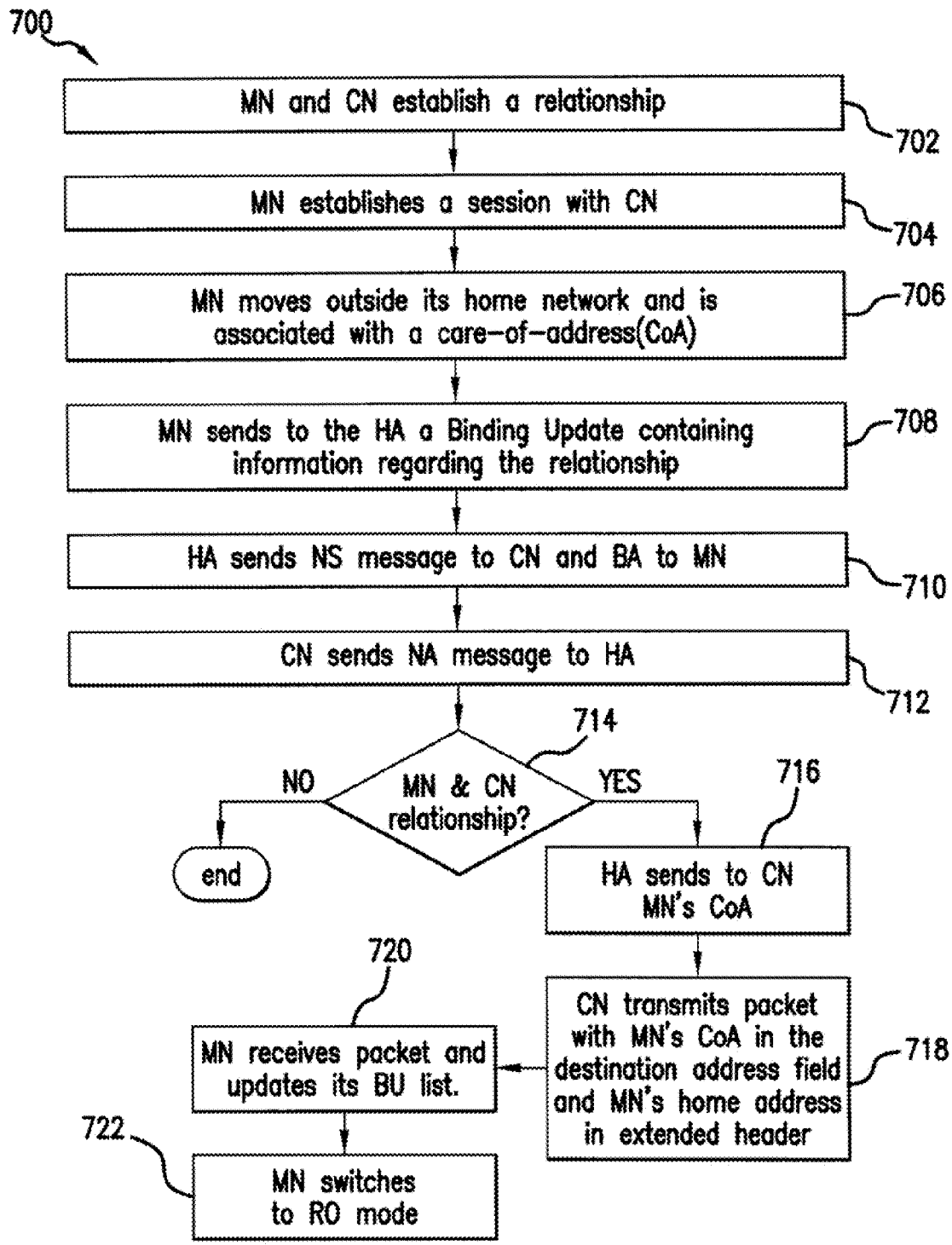
FIG. 7 is a flow chart illustrating a process, according to a third embodiment of the invention, for performing an RO procedure.
Figure 8:
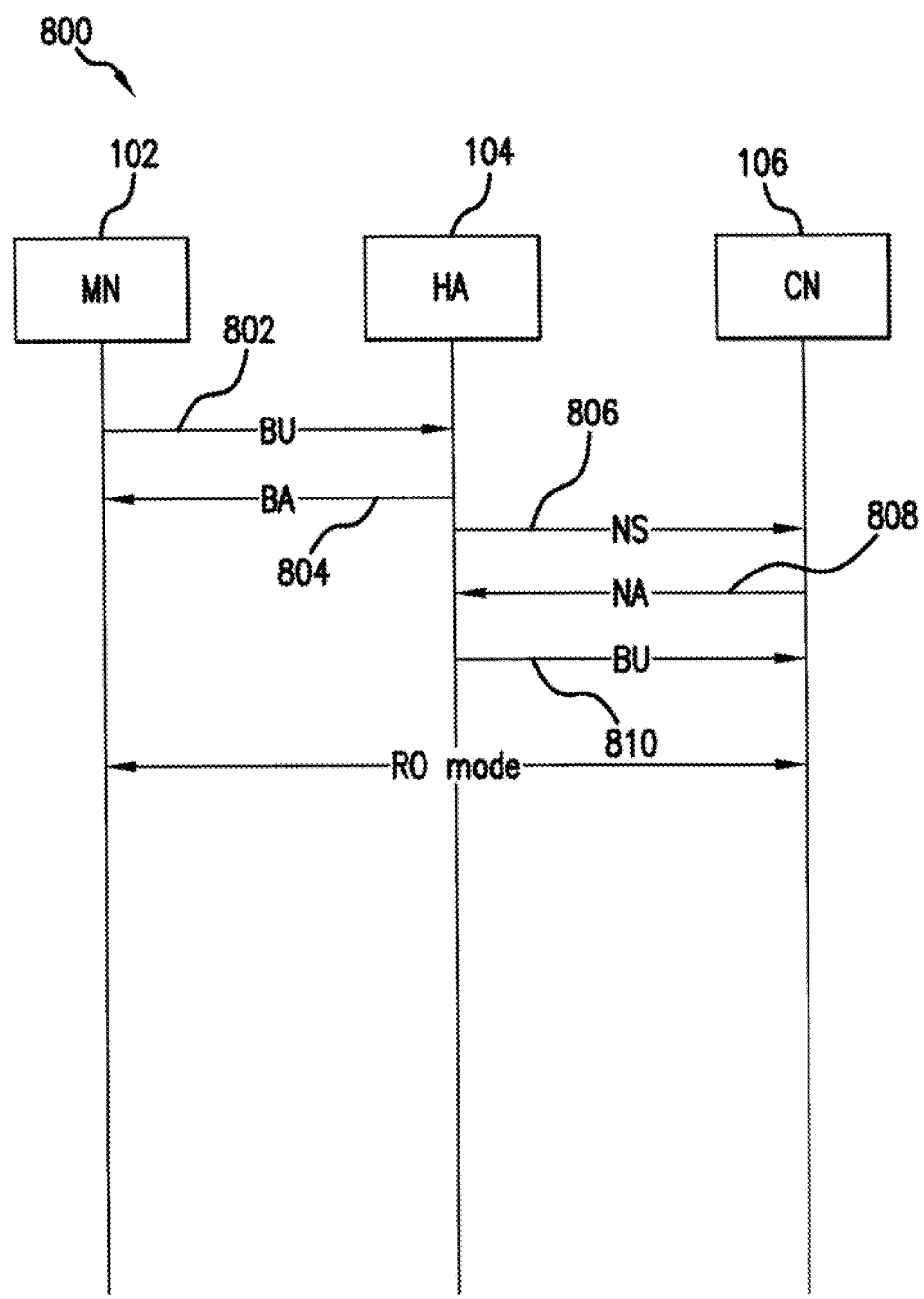
FIG. 8 is a message flow diagram illustrating the RO procedure of FIG. 7.

Referring now to FIG. 7, FIG. 7 is a flow chart illustrating a process 700, according to a third embodiment, for enabling MN 102 and CN 106 to enter the RO mode using few mobility messages. Process 700 may begin in step 702, where MN 102 and CN 106 each establish a relationship with the other (e.g., as described above with reference to process 300). In step 704, MN 102 establishes a session with CN 106 (or vice-versa). In step 706, MN 102 moves outside its home network and obtains a CoA. In step 708, MN 102 sends to HA 104 a BU message 802 (see the message flow diagram 800 shown in FIG. 8). The BU message 802 transmitted in step 708 includes (a) the CoA obtained by MN 102 in step 706 and (b) information disclosing the relationship between MN 102 and CN 106. This information is referred to as "proof of relationship" information, examples of which are provided above in the description of process 300.

In step 710, in response to message 802, HA 104 creates a binding cache entry for MN 102, sends to MN 102 a BA message 804 (see FIG. 8), and sends a message 806 to CN 106. Message 806 seeks confirmation from CN 106 that CN 106 and MN 102 have a trusted relationship. Message 806 may be a "Neighbor Discovery" protocol message (see RFC 2461) that is used to convey MN 102's HoA and public key to CN 106. For this purpose, two parameters may be added in two new options in the "neighbor solicitation (NS)" message. Preferably, the Neighbor solicitation message is be signed by HA 104. The most convenient way to implement the security requirement is to use "Secure Neighbor Discovery (SeND)" (see RFC 3971).

If CN 106 has a relationship with MN 102, then it should reply to HA 104 by disclosing parameters related to the "proof-of relationship" with MN 102. These parameters may be carried in a "Neighbor Advertisement (NA)" message 808 which is sent back to HA 104. Preferably, the "proof-of-relationship" parameters are encrypted. For this purpose, CN 106 may encrypt these parameters with HA 104's public key before signing the entire message. If, however, CN 106 is not interested in disclosing the proof of relationship parameters or does not have such a relationship, then CN 106 should return a simple NA message to HA. In either case, an NA message 808 (or other message) is returned to HA 104 in response to message 806 (step 712).

In step 714, HA 104 determines, based on the response from CN 106 (or lack thereof) to message 806, whether CN 106 and MN 102 have a relationship. If HA 104 determines, that MN 102 and CN 106 do not have a relationship, then process 700 may end, otherwise process 700 proceeds to step 716.

In step 716, HA 104 sends to CN 106 an update message 810 (e.g., Binding Update message) containing, among other things, MN 102's HoA and current CoA. CN 106 may include a secret in message 808 that enables HA 104 to encrypt and authenticate update message 810. In response to message 810, CN 106 creates a Binding Cache entry that associates MN 102's HoA with MN 102's CoA. In step 718, CN 106 transmits an IPv6 packet with MN 102's CoA in the destination address field and MN 102's HoA in an extended header of the packet (e.g., in a type 2 routing header). This packet is routed to MN 102. In step 720, MN 102 receives the packet and, in response to receiving the packet, updates its Binding Update list to indicate that CN 106 has received an "update" concerning MN 102's CoA. In step 722, MN 102 switches to the RO mode.

Figure 9:
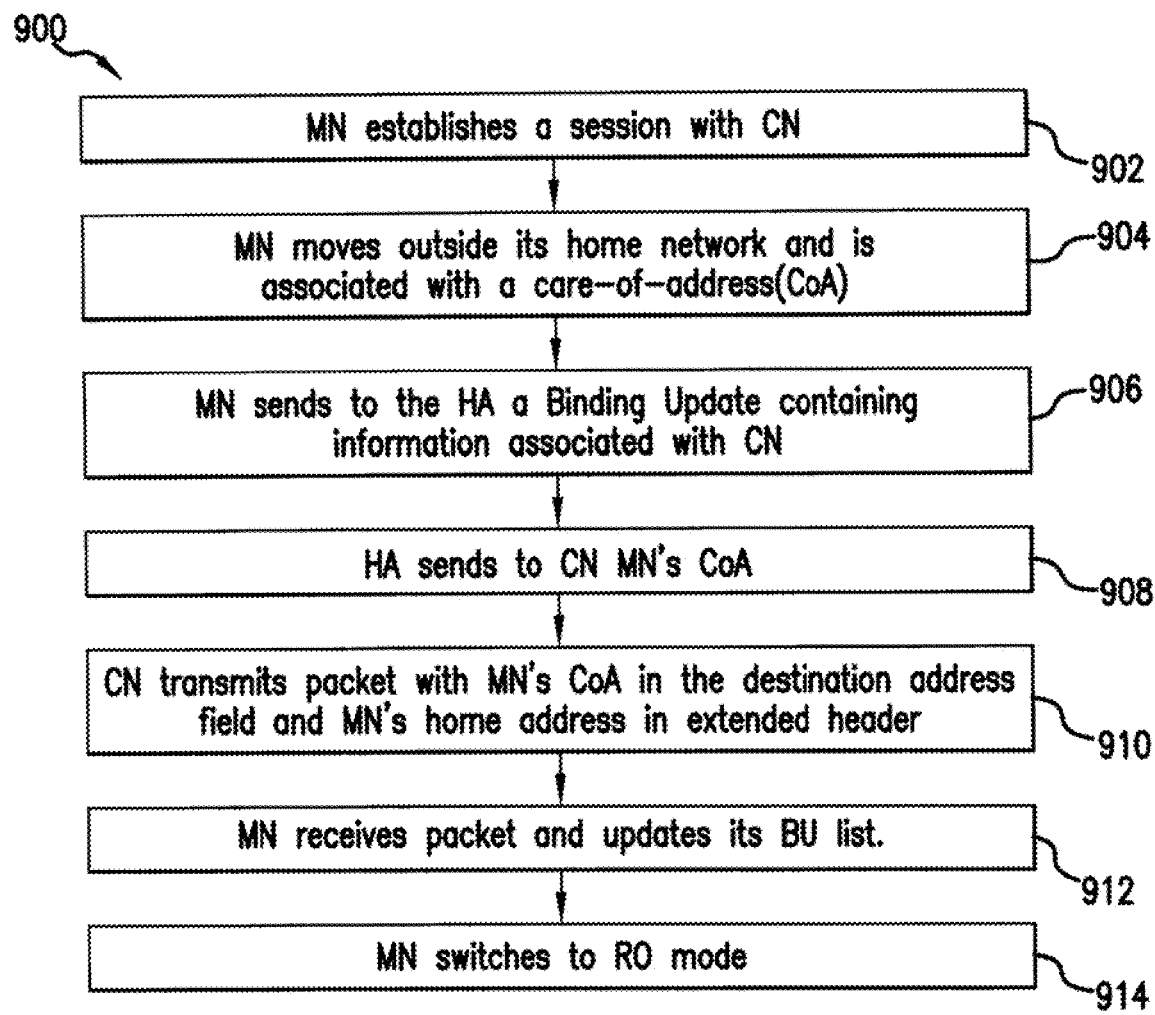
FIG. 9 is a flow chart illustrating a process, according to a fourth embodiment of the invention, for performing an RO procedure.
Figure 10:
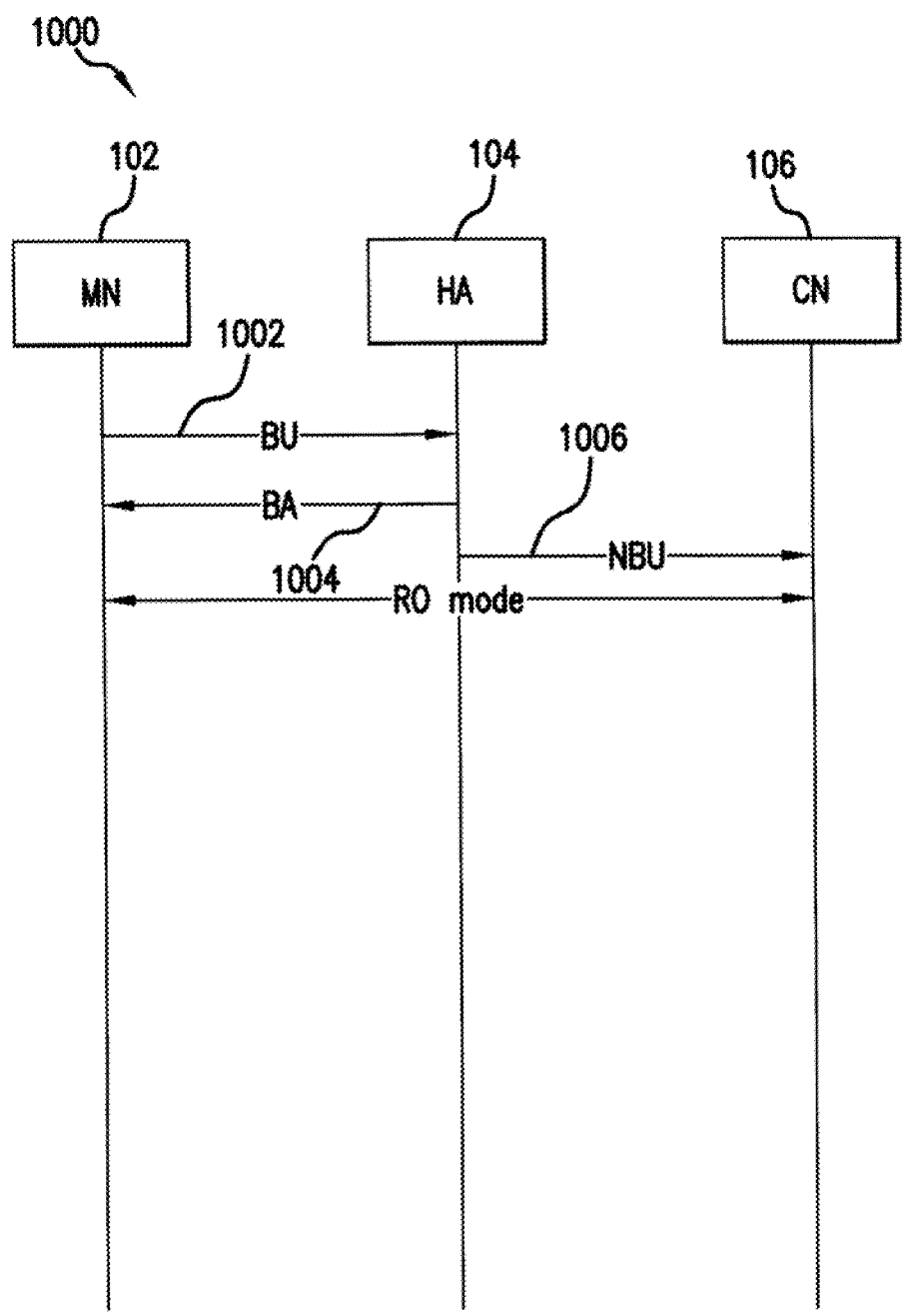
FIG. 10 is a message flow diagram illustrating the RO procedure of FIG. 9.

Referring now to FIG. 9, FIG. 9 is a flow chart illustrating a process 900, according to a fourth embodiment, for enabling MN 102 and CN 106 to enter the RO mode using few mobility messages. Process 900 may begin in step 902, where MN 102 establishes a session with CN 106 (or vice-versa). In step 904, MN 102 moves outside its home network and is associated with and obtains a CoA. In step 906, MN 102 sends to HA 104 a BU message 1002 (see the message flow diagram 1000 shown in FIG. 10). The BU message 1002 transmitted in step 908 includes (a) the CoA obtained by MN 102 in step 906.

In step 908, in response to message 1002, HA 104 creates a binding cache entry for MN 102, sends to MN 102 a BA message 1004 (see FIG. 10), and sends to CN 106 an update message 1006 (e.g., a Binding Update message) containing, among other things, MN 102's HoA and current CoA. In response to message 1006, CN 106 creates a Binding Cache entry that associates MN 102's HoA with MN 102's CoA. In step 910, CN 106 transmits an IPv6 packet with MN 102's CoA in the destination address field and MN 102's HoA in an extended header of the packet (e.g., in a type 2 routing header). This packet is routed to MN 102. In step 912, MN 102 receives the packet and, in response to receiving the packet, updates its Binding Update list to indicate that CN 106 has received an "update" concerning MN 102's CoA. In step 914, MN 102 switches to the RO mode.

Figure 11:
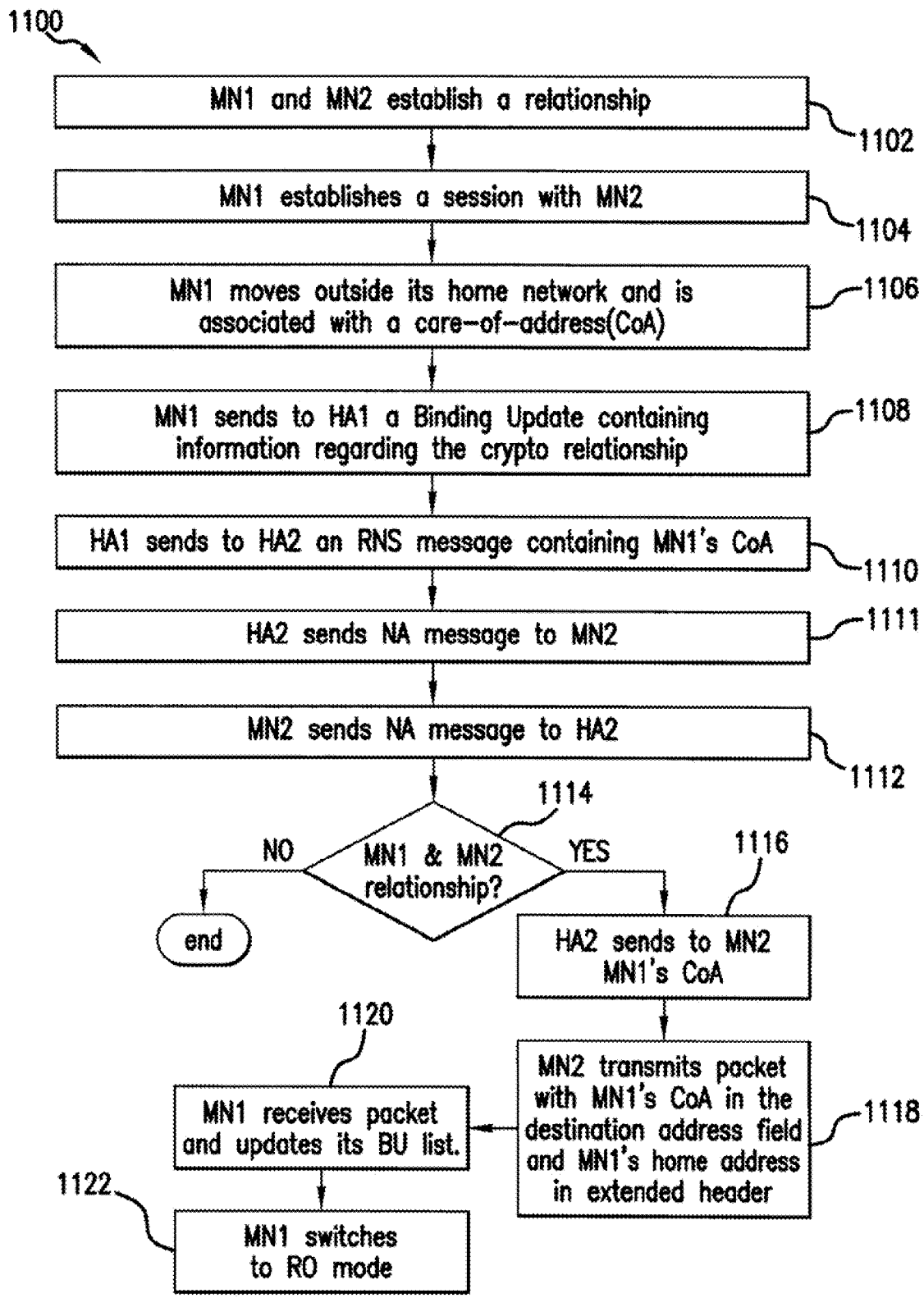
FIG. 11 is a flow chart illustrating a process, according to a fifth embodiment of the invention, for performing an RO procedure.

Referring now to FIG. 11, FIG. 11 is a flow chart illustrating a process 1100, according to a fifth embodiment, for enabling MN 102 and CN 106 to enter the RO mode using few mobility messages. Process 1100 assumes that CN 106 is a mobile node using a different HA (or cluster) than MN 102. For simplicity, MN 102 shall be referred to as MN1, CN 106 shall be referred to as MN2, MN1's home agent shall be referred to as HA1, and MN2's home agent shall be referred to as HA2. Process 1100 also assumes that HA1 has HA2's IP address as well as HA2's advertised prefixes) and public key(s) and vice-versa. For example, HA1 and HA2 may each have a list of other HAs' and their corresponding IP addresses, prefixes and keys. Preferably, for security purposes, HA1 and HA2 can set up and IPsec tunnel between them.

Process 1100 may begin in step 1102, where MN1 and MN2 each (a) auto-configure their IPv6 home address using the CGA technique and (b) establish a relationship with the other, as described above with reference to process 300.

In step 1104, MN1 establishes a session with MN2 (or vice-versa). In step 1106, MN1 moves outside its home network and is associated with and obtains a CoA.

Figure 12:
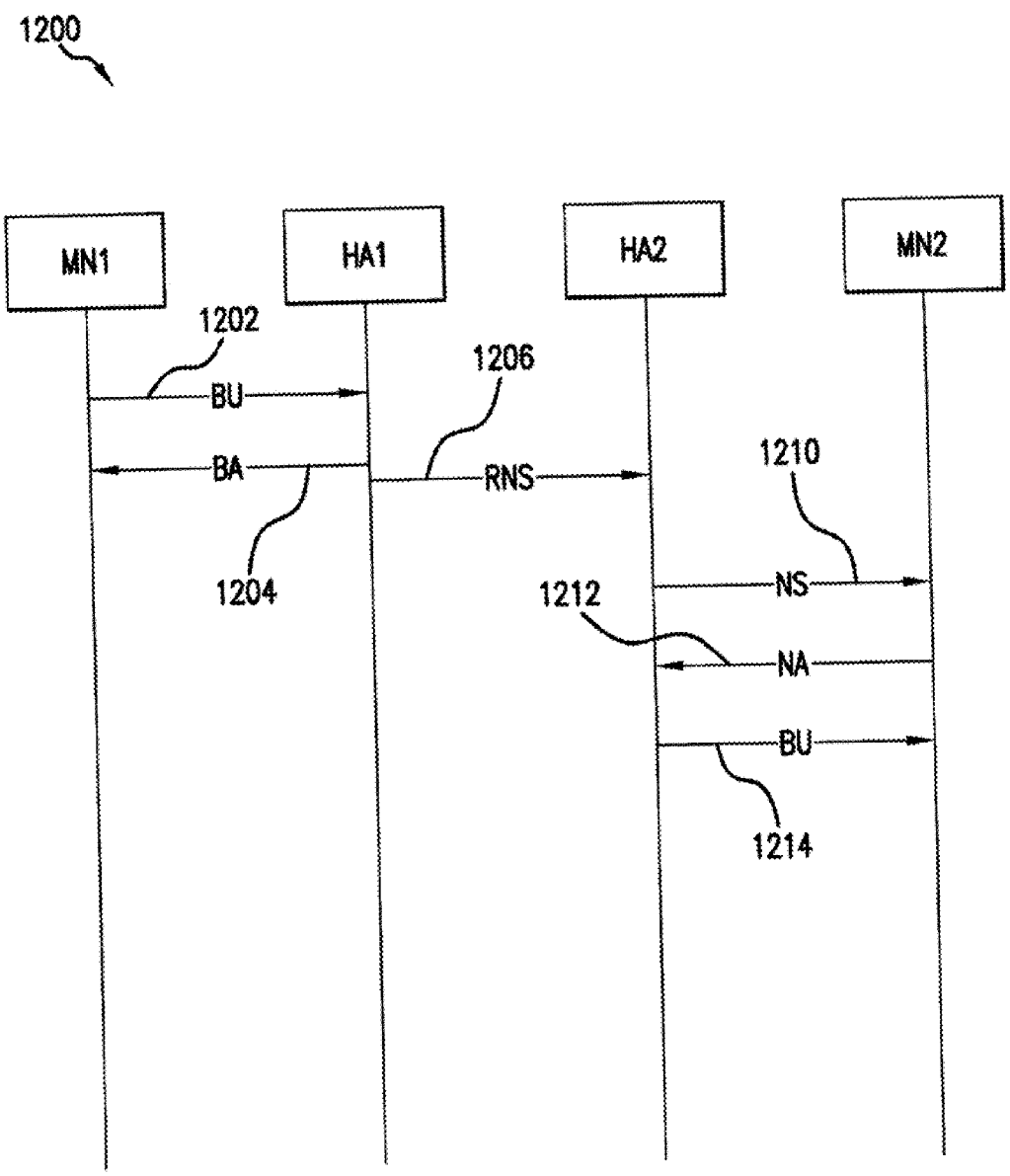
FIG. 12 is a message flow diagram illustrating the RO procedure of FIG. 11.

In step 1108, MN1 sends to HA1 a BU message 1202 (see the message flow diagram 1200 shown in FIG. 12). The BU message 1202 transmitted in step 1108 includes (a) the CoA obtained by MN1 in step 1106 and (b) information disclosing the relationship between MN1 and MN2. This information is referred to as "proof of relationship" information, examples of which are provided above in the description of process 300.

In step 1110, in response to message 1202, HA1 creates a binding cache entry for MN1, sends to MN1 a BA message 1204 (see FIG. 12), uses at least some of the proof of relationship information (e.g., MN2's IP address) to obtain HA2's corresponding parameters (e.g., HA2's IP address and public key) and sends to HA2 an update message 1206 (a.k.a., a "RO Neighbor Solicitation (RNS)" message). Message 1206 includes MN1's CoA and information indicating that MN1 has disclosed in message 1202 that MN1 has a relationship with MN2. Thus, message 1206 may include information identifying MN1 (e.g., MN1' home address) and may also include at least some of the proof of relationship information included in message 1202 (e.g., MN2's home address).

In step 1111, in response to message 1206, HA2 sends a message 1210 to MN2. Message 1210 seeks confirmation from MN2 that MN2 and MN1 have a trusted relationship. Message 1210 may be a "Neighbor Discovery" protocol message that is used to convey MN1's HoA and public key to MN2.

If MN2 has a relationship with MN1, then it should reply to HA2 by disclosing parameters related to the "proof-of relationship" with MN1. These parameters may be carried in a "Neighbor Advertisement (NA)" message 1212 which is sent back to HA2. If, however, MN2 is not interested in disclosing the proof of relationship parameters or does not have such a relationship, then MN2 should return a simple NA message to HA2. In either case, an NA message 1212 (or other message) is returned to HA2 in response to message 1210 (step 1112).

In step 1114, HA2 determines, based on the response from MN2 (or lack thereof) to message 1210, whether MN2 and MN1 have a relationship. If HA2 determines, that MN1 and MN2 do not have a relationship, then process 1100 may end, otherwise process 1100 proceeds to step 1116.

In step 1116, HA2 sends to MN2 an update message 1214 (e.g., Binding Update message) containing, among other things, MN1's HoA and current CoA. MN2 may include a secret in message 1212 that enables HA2 to encrypt and authenticate update message 1214. In response to message 1214, MN2 creates a Binding Cache entry that associates MN1's HoA with MN1's CoA. In step 1118, MN2 transmits an IPv6 packet with MN1's CoA in the destination address field and MN1's HoA in an extended header of the packet (e.g., in a type 2 routing header). This packet is routed to MN1. In step 1120, MN1 receives the packet and, in response to receiving the packet, updates its Binding Update list to indicate that MN2 has received an "update" concerning MN1's CoA. In step 1122, MN1 switches to the RO mode.

Figure 13:
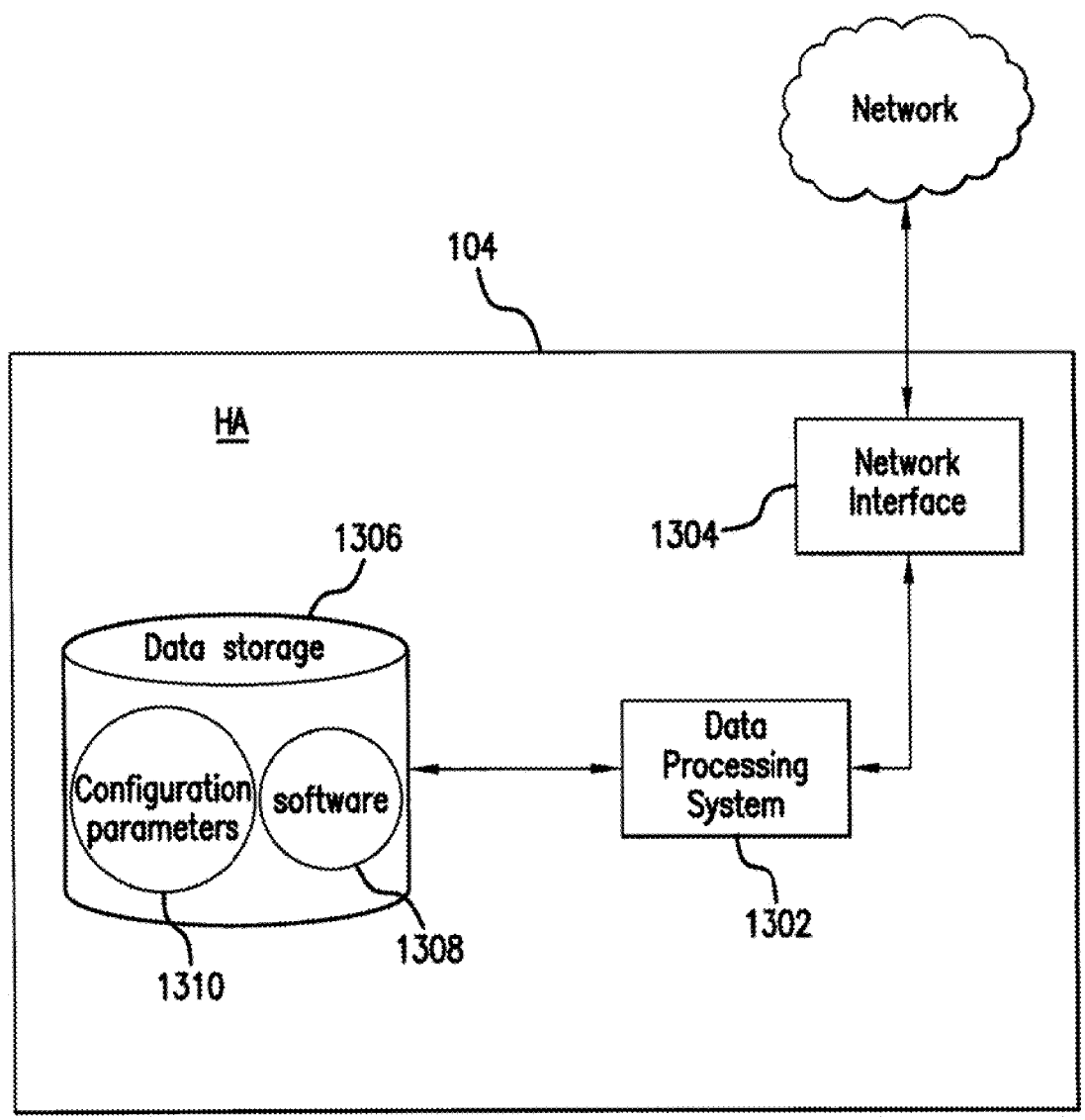
FIG. 13 is a functional block diagram of a home agent according to some embodiments of the invention.

Referring now to FIG. 13, FIG. 13 is a functional block diagram of HA 104 according to some embodiments of the invention. As shown, HA 104 may comprise a data processing system 1302 (e.g. one or more microprocessors, one or more integrated circuits, such as an application specific integrated circuit (ASIC), Field-programmable gate arrays (FPGAs), etc. and any combination of these), a data storage system 1306 (e.g. one or more non-volatile storage devices) and computer software 1308 stored on the storage system 1306. Configuration parameters 1310 may also be stored in storage system 1306. HA 104 may also include one or more network interfaces 1304 for communicating with MN 102 and CN 106. In some embodiments, software 1308 is configured such that when processing system 1302 executes software 1308, HA 104 performs steps described above (e.g., steps described above with reference to the flow charts shown in FIGS. 3, 5, 7, 9 and/or 11). In other embodiments, data processing system 1302 is configured to perform steps described above with reference to the flow charts without the need for software 1308. That is, for example, data processing system may consist merely of one or more ASICs. Hence, the features of the present invention described above may be implemented in hardware and/or software.

Figure 14:
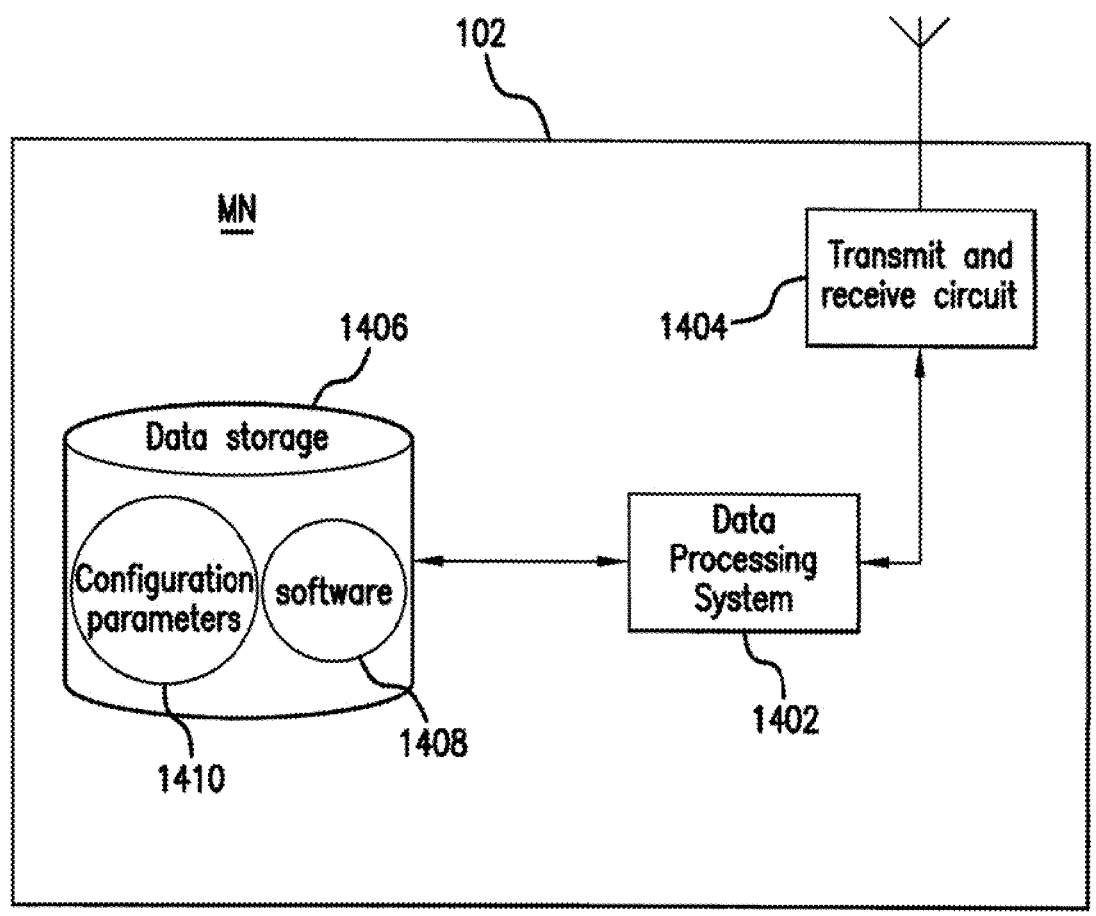
FIG. 14 is a functional block diagram of a mobile node according to some embodiments of the invention.

Referring now to FIG. 14, FIG. 14 is a functional block diagram of MN 102 according to some embodiments of the invention. As shown, MN 102 may comprise a data processing system 1402 (e.g. one or more microprocessors, one or more integrated circuits, such as an application specific integrated circuit (ASIC), Field-programmable gate arrays (FPGAs), etc. and any combination of these), a data storage system 1406 (e.g. one or more non-volatile storage devices) and computer software 1408 stored on the storage system 1406. Configuration parameters 1410 may also be stored in storage system 1406. MN 102 may also include a network interface 1404 for communicating with HA 104 and CN 106. In some embodiments, software 1408 is configured such that when processing system 1402 executes software 1408, HA 104 performs steps described above (e.g., steps described above with reference to the flow charts shown in FIGS. 3, 5, 7, 9 and/or 11). In other embodiments, data processing system 1402 is configured to perform steps described above with reference to the flow charts without the need for software 1408. That is, for example, data processing system may consist merely of one or more ASICs. Hence, the features of the present invention described above may be implemented in hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for route optimization that does not require a return routability procedure, the method comprising the steps of:
    (a) receiving, at a home agent, a first update message transmitted from a mobile node, the first update message comprising a care-of-address (CoA) associated with the mobile node, wherein, in response to receiving the first update message, the home agent binds the CoA associated with the mobile node with a home address assigned to the mobile node; and
    (b) after receiving the first update message, transmitting a second update message from the home agent to a correspondent node, the second update message comprising the CoA associated with the mobile node and the home address assigned to the mobile node;

wherein step (b) is not performed until the home agent determines there is a trusted relationship between the mobile node and the correspondent node, and wherein the trusted relationship exists if the home agent determines there is an end-to-end cryptographic relationship between the mobile node and the correspondent node, and wherein the correspondent node is a node with which the mobile node is communicating;

wherein the correspondent node is a mobile node and the correspondent node has the same home agent as the mobile node, and the method further comprises:

(c) receiving, at the home agent, a third update message transmitted from the correspondent node, the third update message comprising a CoA associated with the correspondent node, wherein, in response to receiving the third update message, the home agent binds the CoA associated with the correspondent node with a home address assigned to the correspondent node, wherein step (b) is not performed until after the home agent receives the third update message.

2. The method of claim 1, further comprising:

(d) after receiving the third update message, determining whether there is the trusted relationship between the mobile node and the correspondent node; and (e) in response to determining that there is the trusted relationship between the two nodes, then transmitting to the mobile node the CoA associated with the correspondent node and transmitting to the correspondent node the CoA associated with the mobile node, wherein steps (d) and (e) are performed by the home agent.

3. The method of claim 2, wherein the first update message comprises a modifier value obtained from the correspondent node and an address generated by the correspondent node, wherein the modifier value was calculated by the correspondent node by hashing a public key belonging to the mobile node with a random number, and the third update message comprises a modifier value obtained from the mobile node and an address generated by the mobile node, wherein the modifier value was calculated by the mobile node by hashing a public key belonging to the correspondent node with a random number.

4. The method of claim 2, wherein the home agent determines there is the trusted relationship between the mobile node and the correspondent node when the home agent determines that the mobile node asserts to have a relationship with the correspondent node and the correspondent node asserts to have a relationship with the mobile node.

5. The method of claim 1, wherein the mobile node has a home link;

the home agent comprises a router on the mobile node's home link, and after the mobile node connects to a foreign link and provides the CoA to the router, the router performs the steps of: (i) intercepting packets on the home link destined to the mobile node's home address, and (ii) tunneling the intercepted packets to the mobile node's CoA.

6. A method for route optimization that does not require a return routability procedure, the method comprising the steps of:

(a) receiving, at a home agent, a first update message transmitted from a mobile node, the first update message comprising a care-of-address (CoA) associated with the mobile node, wherein, in response to receiving the first update message, the home agent binds the CoA associated with the mobile node with a home address assigned to the mobile node; and (b) after receiving the first update message, transmitting a second update message from the home agent to: a home agent of a correspondent node, the second update message comprising the CoA associated with the mobile node and the home address assigned to the mobile node;

wherein the correspondent node is a node with which the mobile node is communicating;

wherein the correspondent node is a mobile node, the correspondent node has a different home agent than the mobile node, the second update message is transmitted from the home agent to the correspondent node's home agent, and the method further comprises:

(c) receiving at the mobile node's home agent a message comprising a CoA associated with the correspondent node, wherein the message comprising the CoA associated with the correspondent node was transmitted to the mobile node's home agent from the correspond node's home agent after the correspondent node's home agent determines there is a trusted relationship between the mobile node and the correspondent node, and wherein the trusted relationship exists if the correspondent node's home agent determines there is an end-to-end cryptographic relationship between the mobile node and the correspondent node; and (d) in response to receiving the message containing the CoA associated with the correspondent node, transmitting, from the mobile node's home agent to the mobile node, a message comprising the CoA associated with the correspondent node.

7. The method of claim 6, wherein, in response to receiving the message from the mobile node's home agent, the mobile node adds to its binding update list a record comprising the CoA associated with the correspondent node.

8. The method of claim 6, wherein:

the first update message further comprises information indicating that the mobile node has a relationship with the correspondent node; and the second update message further comprises information indicating that the mobile node has indicated that it has a relationship with the correspondent node.

9. The method of claim 8, wherein:

the information within the first update message comprises: (i) information identifying the correspondent node; (ii) a public key of the correspondent node; and (iii) a shared secret between the mobile node and the correspondent node; and the information within the second update message comprises the following: (i) the information identifying the correspondent node; (ii) the public key of the correspondent node; and (iii) the shared secret between the mobile node and the correspondent node.

10. A method for route optimization that does not require a return routability procedure, the method comprising the steps of:

(a) receiving, at a home agent, a first update message transmitted from a mobile node, the first update message comprising a care-of-address (CoA) associated with the mobile node, wherein, in response to receiving the first update message, the home agent binds the CoA associated with the mobile node with a home address assigned to the mobile node; and (b) after receiving the first update message, transmitting a second update message from the home agent to a correspondent node, the second update message comprising the CoA associated with the mobile node and the home address assigned to the mobile node;

wherein step (b) is not performed until the home agent determines there is a trusted relationship between the mobile node and the correspondent node, and wherein the trusted relationship exists if the home agent determines there is an end-to-end cryptographic relationship between the mobile node and the correspondent node, and wherein the correspondent node is a node with which the mobile node is communicating;

(c) prior to step (b), transmitting a first message to the correspondent node, wherein the first message is transmitted from the home agent;

(d) receiving at the home agent a second message transmitted from the correspondent node in response to the first message;

(e) after receiving the second message, using information contained in the second message to determine whether there is the trusted relationship between the mobile node and the correspondent node; and (f) after step (e), transmitting the second update message to the correspondent node, wherein step (f) is performed if and only if the home agent determines in step (e) that there is the trusted relationship between the mobile node and the correspondent node.

11. The method of claim 10, wherein the information contained in the second message comprises encrypted parameters associated with the mobile node, and the second message includes a secret that is used by the HA to encrypt information included in the second update message.

12. The method of claim 11, wherein the parameters associated with the mobile node include one or more of the following parameters: the mobile node's public key and a shared secret.

13. A method for route optimization that does not require a return routability procedure, the method comprising the steps of:

(a) receiving, at a home agent, a first update message transmitted from a mobile node, the first update message comprising a care-of-address (CoA) associated with the mobile node, wherein, in response to receiving the first update message, the home agent binds the CoA associated with the mobile node with a home address assigned to the mobile node; and (b) after receiving the first update message, transmitting a second update message from the home agent to a home agent of a correspondent node, the second update message comprising the CoA associated with the mobile node and the home address assigned to the mobile node;

wherein the correspondent node is a node with which the mobile node is communicating;

wherein the correspondent node is a mobile node, the correspondent node has a different home agent than the mobile node, the second update message is transmitted from the home agent to the correspondent node's home agent, and the method further comprises:

in response to receiving the second update message, transmitting, from the correspondent node's home agent, a solicitation message to the correspondent node;

receiving, at the correspondent node's home agent, a response to the solicitation message;

using the response to the solicitation message to determine whether the mobile node and the correspondent node have a trusted relationship, wherein the trusted relationship exists if the correspondent node's home agent determines there is an end-to-end cryptographic relationship between the mobile node and the correspondent node; and transmitting, from the correspondent node's home agent, a third update message to the correspondent node, wherein the third update message comprises the mobile node's home address (HoA) and care-of address (CoA), wherein the correspondent node is configured such that the correspondent node binds the mobile node's HoA and CoA in response to receiving the third update message.

14. An apparatus for facilitating mobile IP route optimization (RO), the apparatus comprising:

a network interface operable to receive a first update message transmitted from a mobile node, the first update message comprising a care-of-address (CoA) associated with the mobile node; and a data processing system configured to (1) bind the CoA associated with the mobile node with a home address (HoA) assigned to the mobile node in response to receiving the first update message and (2) transmit to a correspondent node, a second update message comprising the CoA associated with the mobile node and the home address assigned to the mobile node after receiving the first update message;

wherein the second update message is not transmitted until the data processing system determines there is a trusted relationship between the mobile node and the correspondent node, and wherein the trusted relationship exists if the data processing system determines there is an end-to-end cryptographic relationship between the mobile node and the correspondent node, and wherein the correspondent node is a node with which the mobile node is communicating;

the data processing system is operable to receive via a network interface a third update message transmitted from the correspondent node, the third update message comprising a CoA associated with the correspondent node, wherein, the data processing system is configured such that in response to receiving the third update message to bind the CoA associated with the correspondent node with a home address assigned to the correspondent node, and the data processing system is configured to transmit the second update message only after the data processing system receives the third update message.

15. The apparatus of claim 14, wherein the data processing system is configured such that:

after receiving the third update message, the data processing system determines whether there is the trusted relationship between the mobile node and the correspondent node; and in response to determining that there is the trusted relationship between the two nodes, the data processing system transmits to the mobile node the CoA associated with the correspondent node and transmits to the correspondent node the CoA associated with the mobile node.

16. The apparatus of claim 15, wherein the first update message comprises a modifier value obtained from the correspondent node and an address generated by the correspondent node, wherein the modifier value was calculated by the correspondent node by hashing a public key belonging to the mobile node with a random number, and the third update message comprises a modifier value obtained from the mobile node and an address generated by the mobile node, wherein the modifier value was calculated by the mobile node by hashing a public key belonging to the correspondent node with a random number.

17. The apparatus of claim 15, wherein the data processing system determines there is the trusted relationship between the mobile node and the correspondent node when the home agent determines that the mobile node asserts to have a relationship with the correspondent node and the correspondent node asserts to have a relationship with the mobile node.

18. The apparatus of claim 14, wherein the apparatus is a home agent.

19. The apparatus of claim 18, wherein the home agent is configured such that, after the mobile node connects to a foreign link and provides the CoA to the home agent, the home agent:
  intercepts packets on the home link destined to the mobile node's home address, and
  tunnels the intercepted packets to the mobile node's CoA.

20. An apparatus for facilitating mobile IP route optimization (RO), the apparatus comprising:
  a network interface operable to receive a first update message transmitted from a mobile node, the first update message comprising a care-of-address (CoA) associated with the mobile node; and
  a data processing system configured to (1) bind the CoA associated with the mobile node with a home address (HoA) assigned to the mobile node in response to receiving the first update message and (2) transmit to a correspondent node, a second update message comprising the CoA associated with the mobile node and the home address assigned to the mobile node after receiving the first update message;
  wherein the second update message is not transmitted until the data processing system determines there is a trusted relationship between the mobile node and the correspondent node, and wherein the trusted relationship exists if the data processing system determines there is an end-to-end cryptographic relationship between the mobile node and the correspondent node, and wherein the correspondent node is a node with which the mobile node is communicating;
  the data processing system is configured such that:
  prior to transmitting the second update message to the correspondent node, the data processing system transmits a first message to the correspondent node;
  after receiving a second message transmitted from the correspondent node in response to the first message, the data processing system uses information contained in the second message to determine whether there is the trusted relationship between the mobile node and the correspondent node; and
  the data processing system transmits the second update message to the correspondent node if and only if the data processing system determines that there is the trusted relationship between the mobile node and the correspondent node.

21. The apparatus of claim 20, wherein
  the information contained in the second message comprises encrypted parameters associated with the mobile node, and
  the second message includes a secret that is used by the data processing system to encrypt information included in the second update message.

22. The apparatus of claim 21, wherein the parameters associated with the mobile node include one or more of the following parameters: the mobile node's public key and a shared secret.

23. A home agent for facilitating mobile IP route optimization (RO) by interacting with a correspondent node and another home agent, wherein the another home agent interacts with a mobile node, the home agent comprising:
  one or more network interfaces operable to receive a first update message transmitted from the another home agent, the first update message comprising a care-of-address (CoA) associated with the mobile node and information indicating that the mobile node has indicated that it has a relationship with the correspondent node;
  the one or more network interfaces operable to receive a second update message transmitted from the correspondent node, the second update message comprising a care-of-address (CoA) associated with the correspondent node, and information disclosing that the correspondent node has a relationship with the mobile node;
  a data processing system operable to determine based on the first and second update messages that there is a trusted relationship between the mobile node and the correspondent node, and wherein the trusted relationship exists if the home agent determines there is an end-to-end cryptographic relationship between the mobile node and the correspondent node, and wherein the correspondent node is a node with which the mobile node is communicating.

24. The home agent of claim 23, wherein:
  the information within the first update message comprises the following: (i) information identifying the correspondent node; (ii) a public key of the correspondent node; and (iii) a shared secret between the mobile node and the correspondent node; and
  the information within the second update message comprises: (i) information identifying the mobile node; (ii) a public key of the mobile node; and (iii) a shared secret between the mobile node and the correspondent node.

25. A method implemented by a home agent for facilitating mobile IP route optimization, wherein the home agent interacts with a correspondent node and another home agent, and wherein the another home agent interacts with a mobile node, the method comprising the steps of:
  receiving a first update message transmitted from the another home agent, the first update message comprising a care-of-address (CoA) associated with the mobile node and information indicating that the mobile node has indicated that it has a relationship with the correspondent node;
  receiving a second update message transmitted from the correspondent node, the second update message comprising a care-of-address (CoA) associated with the correspondent node and information disclosing that the correspondent node has a relationship with the mobile node; and
  determining based on the first and second update messages that there is a trusted relationship between the mobile node and the correspondent node, and wherein the trusted relationship exists if the home agent determines there is an end-to-end cryptographic relationship between the mobile node and the correspondent node, and wherein the correspondent node is a node with which the mobile node is communicating.

26. The method of claim 25, wherein:
  the information within the first update message comprises the following: (i) information identifying the correspondent node; (ii) a public key of the correspondent node; and (iii) a shared secret between the mobile node and the correspondent node; and the information within the second update message comprises: (i) information identifying the mobile node; (ii) a public key of the mobile node; and (iii) a shared secret between the mobile node and the correspondent node.

27. A home agent for facilitating mobile IP route optimization (RO) by interacting with a correspondent node and another home agent, wherein the correspondent node is a mobile node, and wherein the another home agent interacts with a mobile node, the home agent comprising:
  one or more network interfaces operable to receive a first update message transmitted from the another home agent, the first update message comprising a care-of-address (CoA) associated with the mobile node and information indicating that the mobile node has indicated that it has a relationship with the correspondent node;
  a data processing system operable in response to receiving the first update message to transmit a solicitation message to the correspondent node, wherein the solicitation message is requesting confirmation from the correspondent node that the correspondent node and the mobile node have a trusted relationship;
  the one or more network interfaces operable to receive a response to the solicitation message;
  the data processing system operable in response to the solicitation message to determine whether the mobile node and the correspondent node have a trusted relationship, wherein the trusted relationship exists if the data processing system determines there is an end-to-end cryptographic relationship between the mobile node and the correspondent node; and
  the one or more network interfaces operable to transmit a second update message to the correspondent node if the data processing system has determined there is the end-to-end cryptographic relationship between the mobile node and the correspondent node, wherein the second update message comprises the mobile node's home address (HoA) and care-of address (CoA).

28. The home agent of claim 27, wherein the information within the first update message comprises the following: (i) information identifying the correspondent node; (ii) a public key of the correspondent node; and (iii) a shared secret between the mobile node and the correspondent node.

29. A method implemented by a home agent for facilitating mobile IP route optimization, wherein the home agent interacts with a correspondent node and another home agent, wherein the correspondent node is a mobile node, and wherein the another home agent interacts with a mobile node, the method comprising the steps of:
  receiving a first update message transmitted from the another home agent, the first update message comprising a care-of-address (CoA) associated with the mobile node and information indicating that the mobile node has indicated that it has a relationship with the correspondent node;
  in response to receiving the first update message, transmitting a solicitation message to the correspondent node, wherein the solicitation message is requesting confirmation from the correspondent node that the correspondent node and the mobile node have a trusted relationship;
  receiving a response to the solicitation message;
  in response to the solicitation message, determining whether the mobile node and the correspondent node have a trusted relationship, wherein the trusted relationship exists if the data processing system determines there is an end-to-end cryptographic relationship between the mobile node and the correspondent node; and
  if there is the end-to-end cryptographic relationship between the mobile node and the correspondent node, then transmitting a transmit a second update message to the correspondent node, wherein the second update message comprises the mobile node's home address (HoA) and care-of address (CoA).

30. The method of claim 29, wherein the information within the first update message comprises the following: (i) information identifying the correspondent node; (ii) a public key of the correspondent node; and (iii) a shared secret between the mobile node and the correspondent node.

* * * * *